US010048084B2

(12) United States Patent
Laine et al.

(10) Patent No.: US 10,048,084 B2
(45) Date of Patent: Aug. 14, 2018

(54) STAR TRACKER-AIDED AIRBORNE OR SPACECRAFT TERRESTRIAL LANDMARK NAVIGATION SYSTEM

(71) Applicant: The Charles Stark Draper Laboratory, Inc., Cambridge, MA (US)

(72) Inventors: Juha-Pekka J. Laine, Boston, MA (US); Gregory P. Blasche, Burlington, MA (US); Matthew T. Jamula, Brighton, MA (US); Paul A. Bohn, St. Petersburg, FL (US); Robin Mark Adrian Dawson, Waltham, MA (US); Benjamin F. Lane, Sherborn, MA (US); Eric T. Hoke, Somerville, MA (US); Daniel M. Meiser, Providence, RI (US); Joseph M. Kinast, Cambridge, MA (US); Stephen P. Smith, Acton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 338 days.

(21) Appl. No.: 15/267,918

(22) Filed: Sep. 16, 2016

(65) Prior Publication Data
US 2018/0080787 A1    Mar. 22, 2018

(51) Int. Cl.
*G01C 21/30* (2006.01)
*G01C 21/00* (2006.01)
(Continued)

(52) U.S. Cl.
CPC ....... *G01C 21/3602* (2013.01); *G01C 21/005* (2013.01); *G01C 21/025* (2013.01);
(Continued)

(58) Field of Classification Search
CPC ................... G05B 19/18; H01Q 3/00
See application file for complete search history.

(56) References Cited

U.S. PATENT DOCUMENTS

| 5,809,457 A | 9/1998 | Yee et al. ............ 701/220 |
| 2002/0004691 A1 | 1/2002 | Kinashi et al. |
| (Continued) | | |

FOREIGN PATENT DOCUMENTS

WO    WO 2007/001471    1/2007

OTHER PUBLICATIONS

Korean Intellectual Property Office, International Searching Authority, International Search Report and Written Opinion, International Application No. PCT/US2017/044809, 20 pages, dated Jan. 16, 2018.

*Primary Examiner* — Yonel Beaulieu
*Assistant Examiner* — Martin A Weeks
(74) *Attorney, Agent, or Firm* — Sunstein Kann Murphy & Timbers LLP

(57) ABSTRACT

Methods and apparatus automatically determine a location, such as of an aircraft or spacecraft, by matching images of terrain below the craft, as captured by a camera, radar, etc. in the craft, with known or predicted terrain landmark data stored in an electronic data store. A star tracker measures attitude of the camera. Optionally, a rangefinder measures altitude of the camera above the terrain. A navigation filter uses the attitude, and optionally the altitude, to resolve attitude, and optionally altitude, ambiguities and thereby avoid location solution errors common in prior art terrain matching navigation systems.

31 Claims, 14 Drawing Sheets

(51) Int. Cl.
  *G01C 21/36* (2006.01)
  *G06K 9/00* (2006.01)
  *G01C 21/02* (2006.01)
  *G06F 17/30* (2006.01)

(52) U.S. Cl.
  CPC .......... *G01C 21/30* (2013.01); *G06K 9/0063* (2013.01); *G06F 17/30247* (2013.01)

(56) References Cited

U.S. PATENT DOCUMENTS

| | | | |
|---|---|---|---|
| 2006/0149458 A1 | 7/2006 | Costello et al. | |
| 2010/0208244 A1* | 8/2010 | Earhart | G01S 3/7867 |
| | | | 356/139.01 |
| 2011/0004405 A1 | 1/2011 | Hutchin | |
| 2015/0219423 A1* | 8/2015 | Zondervan | F41G 7/22 |
| | | | 244/3.15 |
| 2017/0023365 A1* | 1/2017 | Hunter, Jr. | G06T 7/74 |
| 2017/0053536 A1* | 2/2017 | Wright | F41G 7/346 |

\* cited by examiner

STAR TRACKER-AIDED AIRBORNE OR SPACECRAFT TERRESTRIAL LANDMARK NAVIGATION SYSTEM

TECHNICAL FIELD

The present invention relates to terrain matching navigation systems and, more particularly, to such navigation systems that measure and take into account attitude of a terrain imager when calculating a location.

BACKGROUND ART

Known navigation techniques and systems compare images of terrain taken from aircraft to data previously stored in databases of terrain imagery to find matches and, therefore, ascertain their locations. For example, some cruise missiles use a terrain contour matching system referred to as TERCOM. However, location solutions provided by such systems are inaccurate due to attitude ambiguities in imaging equipment.

SUMMARY OF EMBODIMENTS

An embodiment of the present invention provides a location determining system. The system includes a database that stores terrain landmark data. The terrain landmark data is stored in association with geographic location information about the terrain landmark data. The system also includes an imager. The imager is configured to aim downward toward terrain below the imager. The imager is also configured to generate terrain data representing a surface aspect of the terrain. The imager may include an optical camera, a radar, a LIDAR or other imager.

A matching engine compares the terrain data to the terrain landmark data and determines an estimated location of the imager, based on: (a) a match between the terrain data and the terrain landmark data and (b) the geographic location information associated with the terrain landmark data.

The system also includes a star tracker. The star tracker is configured to measure attitude of the imager. A navigation filter calculates a corrected location of the imager from: (a) the estimated location of the imager and (b) the attitude of the imager.

As noted, the imager may include a radar. The terrain data may include terrain topographical data. The imager may include an optical camera. The terrain data may include terrain image data.

The imager and the star tracker may share a common image sensor. The imager may include an objective lens, and the star tracker may include a telescope. The location determining system may also include a beam splitter. The beam splitter may be disposed to combine light from the objective lens and light from the telescope into an output signal directed toward the common image sensor.

The location determining system may include a first mirror and a second mirror. The first mirror may be disposed between the objective lens and the common image sensor. The first mirror may be oriented to reflect light from the objective lens toward the common image sensor. The second mirror may be disposed between the telescope and the common image sensor. The second mirror may be oriented to reflect light from the telescope toward the common image sensor.

The imager and the star tracker may include a single objective lens. The single objective lens may have a field of view sufficiently large to simultaneously include the terrain and at least one bright celestial object. The single objective lens may be configured to simultaneously capture light from the terrain and from at least one bright celestial object. The imager and the star tracker may share a common image sensor. Light from the single objective lens may impinge onto the common image sensor.

The location determining system may also include an altimeter. The altimeter may be configured to provide an altitude of the imager above the terrain. The navigation filter calculates the corrected location of the imager from: the estimated location of the imager, the attitude of the imager and the altitude of the imager above the terrain. The altimeter may be configured to determine the altitude of the imager based on the terrain data from the imager.

Another embodiment of the present invention provides a method for automatically determining a location. The method includes storing terrain landmark data in an electronic database. The terrain landmark data is stored in association with geographic location information about the terrain landmark data.

An imager generates terrain data. The imager images the terrain from above. The terrain data represents a surface aspect of terrain below the imager.

The terrain data is automatically compared to the terrain landmark data in the electronic database. An estimated location of the imager is and output. The estimated location is based on: (a) a match between the terrain data and the terrain landmark data and (b) the geographic location information associated with the terrain landmark data.

Attitude of the imager is automatically measured with a star tracker. A corrected location of the imager is automatically calculated from: the estimated location of the imager and the attitude of the imager.

The terrain data may be generated with a radar. The terrain data may include terrain topographical data. The terrain data may be generated with an optical camera. The terrain data may include terrain image data.

Generating the terrain data and automatically measuring the attitude of the imager with the star tracker may involve using a common image sensor. The common image sensor may be used to image the terrain and to image a bright celestial object. Light from an objective lens of the imager and light from a telescope of the star tracker may be combined into an output signal directed toward the common image sensor. A first mirror may reflect light from an objective lens of the imager toward the common image sensor. A second mirror may reflect light from a telescope of the star tracker toward the common image sensor.

A single objective lens may be provided. The single objective lens may have a field of view sufficiently large to simultaneously include the terrain and at least one bright celestial object. Generating the terrain data and automatically measuring the attitude of the imager with the star tracker may include using the single objective lens to simultaneously image the terrain and the at least one bright celestial object.

A single objective lens may be provided. The single objective lens may be configured to simultaneously capture light from the terrain and from at least one bright celestial object. Generating the terrain data and automatically measuring the attitude of the imager with the star tracker may include using the single objective lens to simultaneously direct light from the terrain and from the at least one bright celestial object onto a common image sensor.

An altitude of the imager above the terrain may be automatically measured. Automatically calculating the corrected location of the imager may include automatically calculating the corrected location of the imager from: the estimated location of the imager, the attitude of the imager and the altitude of the imager above the terrain.

Automatically measuring the altitude of the imager above the terrain may include automatically determining the altitude based on the terrain data from the imager.

Generating the terrain data may include generating the terrain data with an optical camera. The terrain data may include terrain image data. Generating the terrain data may include generating the terrain data with a radar. The terrain data may include terrain topographical data.

Yet another embodiment of the present invention provides a computer program product. The computer program product includes a non-transitory computer-readable medium. Computer instructions are stored on the non-transitory computer-readable medium. A processor may execute the computer instructions.

The processor may be coupled to an imager. The imager may be configured to aim downward toward terrain below the imager. The imager may be configured to generate terrain data. The terrain data may represent a surface aspect of the terrain. The processor may also be coupled to a star tracker. The star tracker may be configured to measure attitude of the imager. The processor may also be coupled to a database. The database may store terrain landmark data. The terrain landmark data may be stored in association with geographic location information about the terrain landmark data.

When the processor executes the instructions, processes are established. The processes perform a computer-implemented method for automatically determining a location of the imager. The processes include a matching engine that compares the terrain data from the imager to the terrain landmark data from the database. The matching engine determines an estimated location of the imager. The estimated location is determined based on: (a) a match between the terrain data and the terrain landmark data and (b) the geographic location information associated with the terrain landmark data.

The processes also include a process that is configured to use the star tracker to measure attitude of the imager. The processes also include a navigation filter. The navigation filter calculates a corrected location of the imager from: (a) the estimated location of the imager and (b) the attitude of the imager.

An embodiment of the present invention provides a location determining system. The system includes a camera, a star tracker, a database, a filter and a matching engine. The camera has an optical axis. The camera is configured to image terrain below the camera. The camera is configured to provide image data representing an image of the terrain.

The star tracker is mechanically coupled to the camera. The star tracker is configured to measure angular orientation of the camera.

The database stores landmark imagery associated with respective corresponding geographic locations.

The filter is coupled to the camera and to the star tracker. The filter is configured to generate corrected image data. The filter compensates for deviation of the optical axis from normal to the terrain. The filter performs the compensation based on the angular orientation of the camera.

The filter may be configured to correct the image data, according to the angular orientation of the camera. The filter thereby generates corrected image data. The corrected image data represents an image of the terrain, as the image would appear if the camera had been oriented normal to the terrain.

The matching engine is coupled to the filter and to the database. The matching engine is configured to search the database for a landmark image that matches, within a predetermined criterion, the corrected image data. The matching engine is also configured to output a geographic location that corresponds to a found landmark image.

The location determining system may also include a range finder. The range finder may be configured to measure distance between the camera and the terrain. The matching engine may be coupled to the range finder. The matching engine may be configured to use the distance to search the database for the landmark image that matches, within the predetermined criterion, the corrected image data.

BRIEF DESCRIPTION OF THE SEVERAL VIEWS OF THE DRAWING

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for automatically determining a location by matching terrain imagery, with improved accuracy over prior art systems. Embodiments of the present invention use star trackers to measure attitudes of terrain imagers. Navigation filters combine location estimates from terrain matchers with attitudes of the terrain imagers, and optionally altitudes of the terrain imagers, to calculate locations more precisely than the terrain matchers alone.

Figure 1:
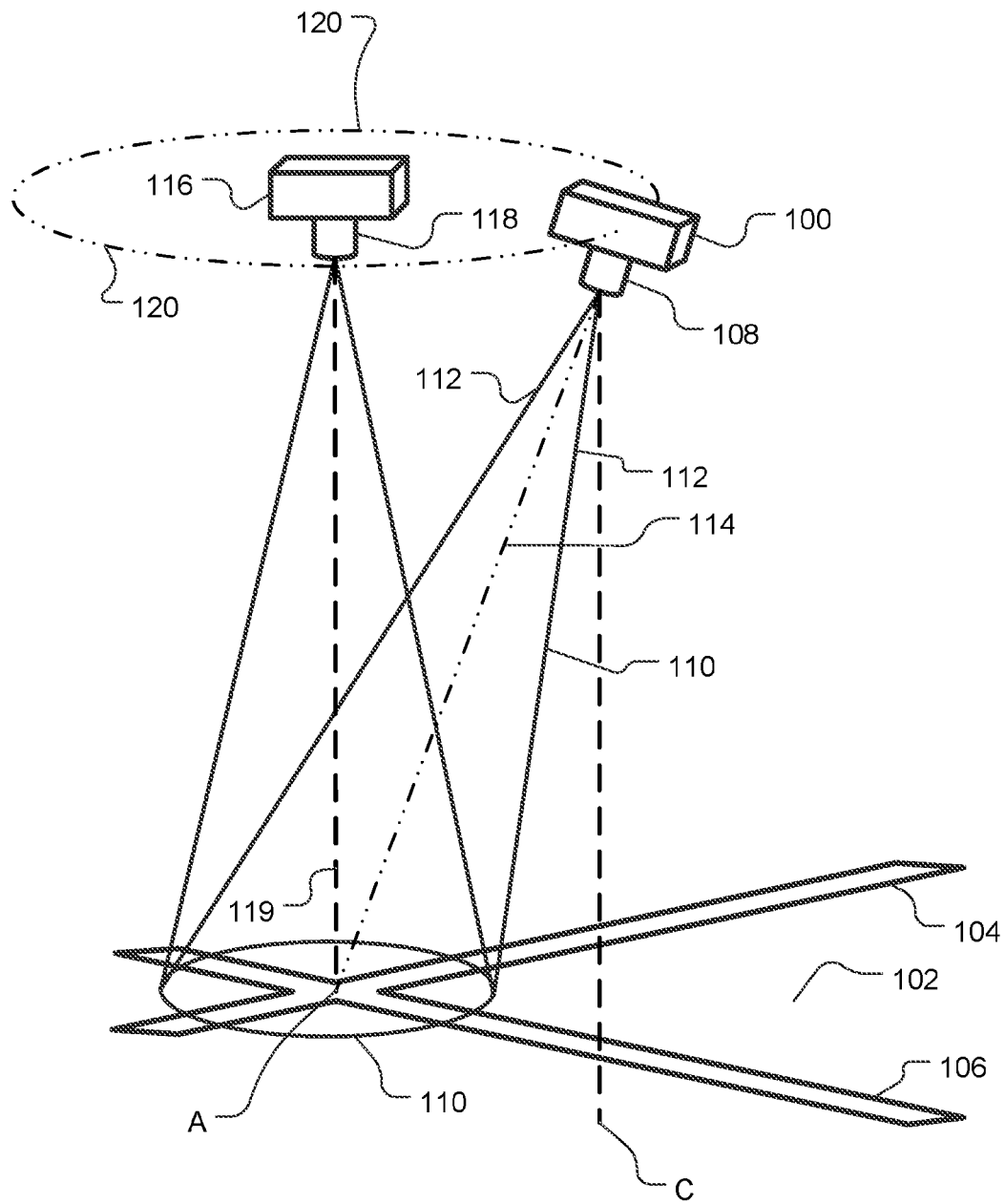
FIG. 1 is a schematic diagram illustrating an exemplary hypothetical context for a terrain matching navigation system, as well as problems associated with prior art terrain matching navigation systems.
Figure 2:
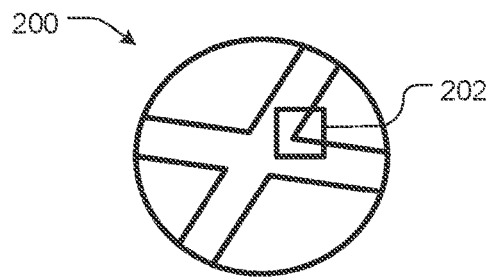
FIGS. 2 and 3 are exemplary hypothetical images captured by cameras in a prior art terrain matching navigation system.

FIG. 1 is a schematic diagram illustrating an exemplary hypothetical context for a terrain matching navigation system, as well as problems associated with prior art terrain matching navigation systems. A prior art terrain matching system 100 flies, such as in an aircraft or spacecraft (not shown), over terrain 102 that includes imagable terrain surface features, such as roads 104 and 106. The terrain matching system 100 includes a camera 108 that images a portion 110 of the terrain 102, as indicated by lines 112. FIG. 2 is an exemplary hypothetical image 200 captured by the camera 108. The terrain matching system 100 compares the image 200 to a database (not shown) of pre-stored terrain imagery. Based on a match found by the terrain matching system 100, the terrain matching system 100 ascertains the location of the terrain matching system 100 and, therefore, the location of the aircraft or spacecraft.

However, as shown in FIG. 1, the attitude of the terrain matching system 100 may be such that the optical axis 114 of the camera 108 is not perpendicular to the terrain 102. In other words, the image 200 (FIG. 2) may not be taken while the camera 108 looks straight down at the terrain 102.

Figure 3:
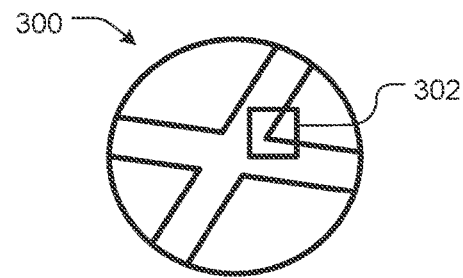

Another terrain matching system, for example terrain matching system 116, with a camera 118 having an optical axis 119 that is aimed perpendicular to the terrain 102, would have a slightly different point of view than the camera 108. FIG. 3 is an exemplary hypothetical image 300 captured by the camera 118. However, due to imperfections in the optical systems of the cameras 108 and 118 and pixilation of the images 200 and 300 captured by the two cameras 108 and 118, the resulting images 200 and 300 may be indistinguishable to the terrain matching system 100, leading to location solution errors.

Figure 4:
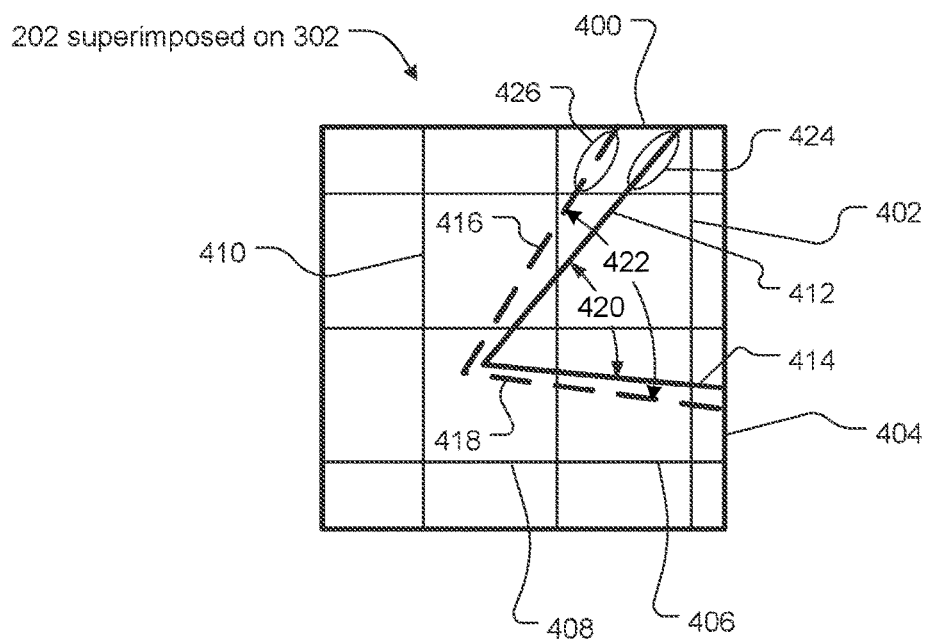
FIG. 4 shows enlarged and registered portions of FIGS. 2 and 3.

To further illustrate this problem, corresponding portions 202 and 302 of the images 200 (FIG. 2) and 300 (FIG. 3) are shown enlarged and registered in FIG. 4. Individual exemplary pixels of the images 200 and 300 are shown at 400, 402, 404, 406, 408 and 410. Respective edges 412 and 414 of the roads 104 and 106, as imaged by the camera 108, are shown in solid line. Corresponding edges 416 and 418 of the same roads 104 and 106, as imaged by the other camera 118, are shown in dashed line.

Although the two cameras 108 and 118 project the edges 412-418 of the roads 104 and 106 onto slightly different portions of their respective image sensors, and angles 420 and 422 formed by the respective edges 412-418 are slightly different, the differences are indistinguishable to the terrain matching system 100, because the edges 412-418 fall on the same pixels 400-410 in both images 200 and 300. For example, a portion 424 of the edge 412 falls on the same pixel 400 as the corresponding portion 426 of the edge 416. Similarly, other portions of the edges 412 and 414 imaged by one camera 108 fall on the same pixels 402, 406, 408 and 410, respectively, as corresponding portions of the edges 416 and 418 imaged by the other camera 118.

Many terrain matching systems employ edge detection technology to simplify the process of image matching. However, as shown in FIG. 4, the edge 412 imaged by one camera 108 would be found on the same pixels 400, 402, 410 and 408 as the edge 416 imaged by the other camera 118, and the edge 414 would be found on the same pixels 408, 406 and 404 as the edge 418. Thus, the terrain matching systems 100 and 116 (FIG. 1) would not be able to distinguish between the images 200 and 300 captured by their respective cameras 108 and 118. Most or all pre-stored terrain imagery, to which the images 200 and 300 would be compared, is captured, or at least is assumed to be captured, perpendicular to the terrain 102. Consequently, the terrain matching system 100 (FIG. 1) would conclude the system 100 is directly over point A on the terrain 102, whereas the system 100 is actually directly over point C.

Depending on the size of the pixels 400-410, optical resolution of a camera (ex. camera 108), height of the camera 108 above the terrain 102 and other factors, a camera disposed within a circle 120 (FIG. 1) and aimed at point A on the terrain 102 would not be able to distinguish between images the camera captures and images taken by the camera 118, which is disposed at the center of the circle 120 and aimed directly downward. We refer to inaccuracies in resulting location solutions as being caused by attitude ambiguities of the camera 108.

Figure 5:
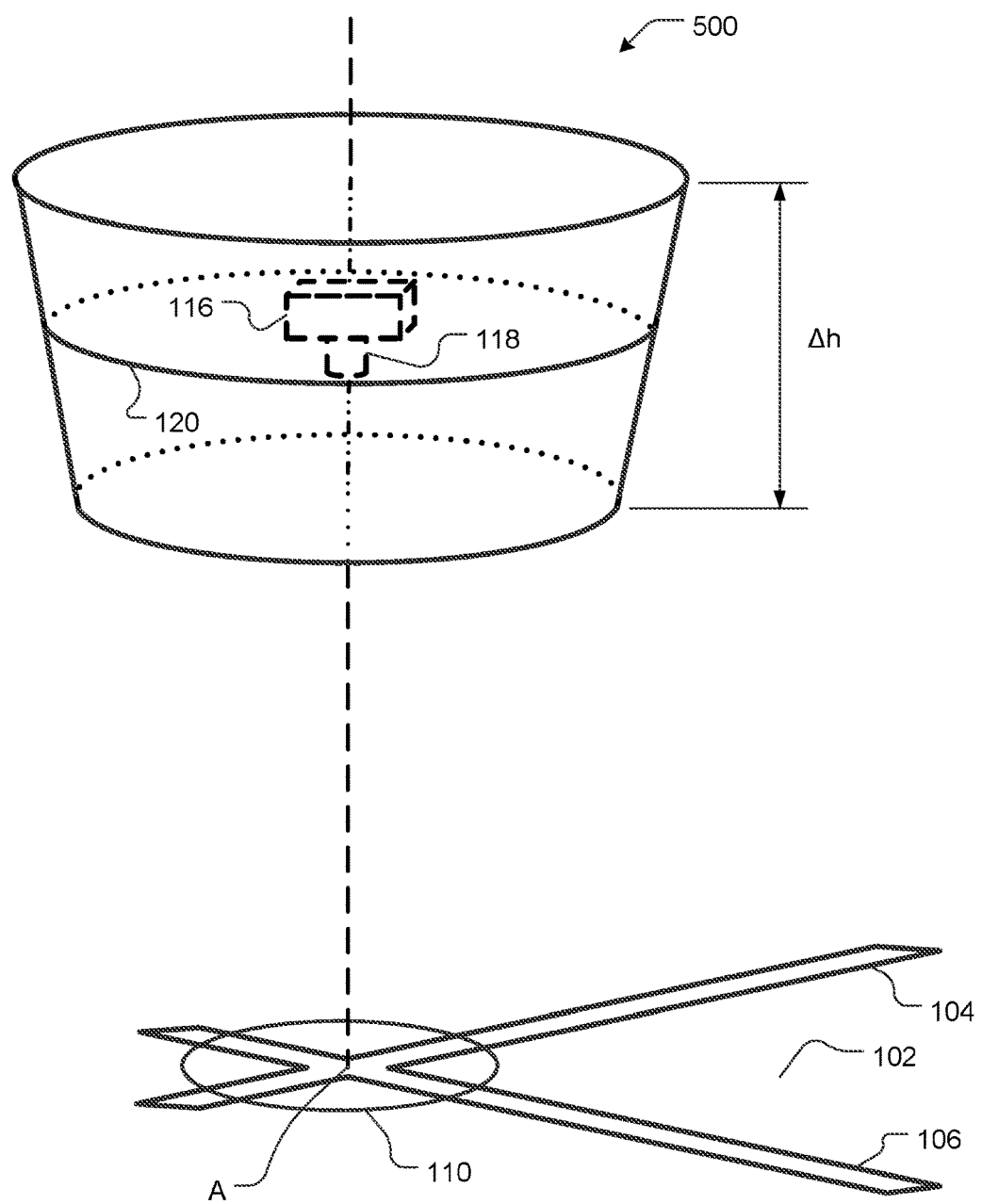
FIG. 5 is similar to FIG. 1 and schematically illustrates a volume, represented by a truncated cone, within which cameras in prior art terrain matching navigation system experience attitude and altitude ambiguity errors.

Furthermore, as schematically illustrated in FIG. 5, a camera disposed within a truncated cone 500 would not be able to distinguish between images the camera captures and images taken by the camera 118 disposed at the center of the circle 120. The truncated cone 500 has a height $\Delta h$, and a camera disposed within the truncated cone 500 at any height within $\Delta h$ would not be able to distinguish between images the camera captures and images taken by the camera 118 disposed at the height of the circle 120. We refer to inaccuracies in resulting location solutions as being caused by altitude ambiguities of the camera 108.

Embodiments of the present invention solve the attitude ambiguity problem. Some embodiments also include features that particularly address the altitude ambiguity problem.

Figure 6:
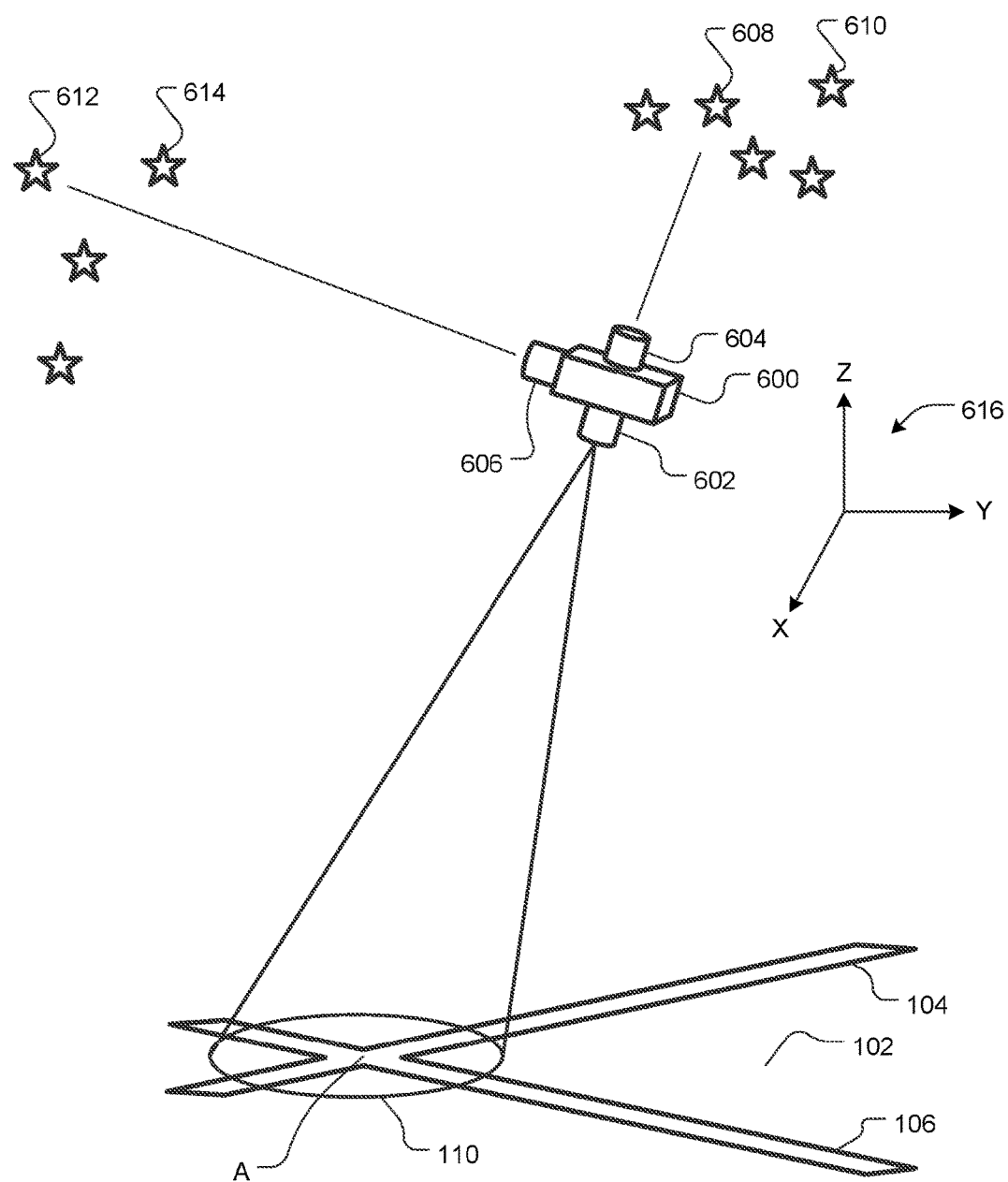
FIGS. 6-8 show the same context as FIG. 1, but schematically illustrate a terrain matching navigation system according to embodiments of the present invention.

FIG. 6 is a schematic diagram illustrating the same context as shown in FIGS. 1 and 5. A terrain matching system 600, such as in an aircraft or spacecraft (not shown) includes a camera 602 that images a portion 110 of the terrain 102, as discussed with respect to FIG. 1. However, according to an embodiment of the present invention, the terrain matching system 600 includes a star tracker, exemplified by star trackers 604 and 606. One star tracker 604 or 606 is sufficient, although some embodiments include more than one star tracker per terrain matching system 600. Star tracker 604 is oriented directly opposite the camera 602, and star tracker 606 is oriented perpendicular to the camera 602, although other angular relationships between the orientation of the star tracker 604 or 606 and the orientation of the camera 602 may be used. For simplicity of explanation, one star tracker 604 is assumed in the following description.

The star tracker 604 may include a telescope, an image sensor and an ephemeral database (not shown), as is well known in the art. The star tracker 604 images one or more stars, satellites and/or other bright celestial objects, represented by stars 608, 610, 612 and 614, whose ephemeris is known, and the star tracker 604 automatically ascertains the attitude of the star tracker 604 in some coordinate system, exemplified by an x-y-z coordinate system 616.

The star tracker 604 is held in a fixed orientation, relative to the camera 602. For example, the star tracker 604 may be mechanically attached to the camera 602 or to a housing (not shown) of the camera 602. Alternatively, both the star tracker 604 and the camera 602, or a housing (not shown) of the camera 602, may be independently mechanically attached to a common relatively ridged member, such as a fuselage of a spacecraft or a beam or plate. Consequently, the star tracker 604 can measure the attitude of the camera 602.

Figure 7:
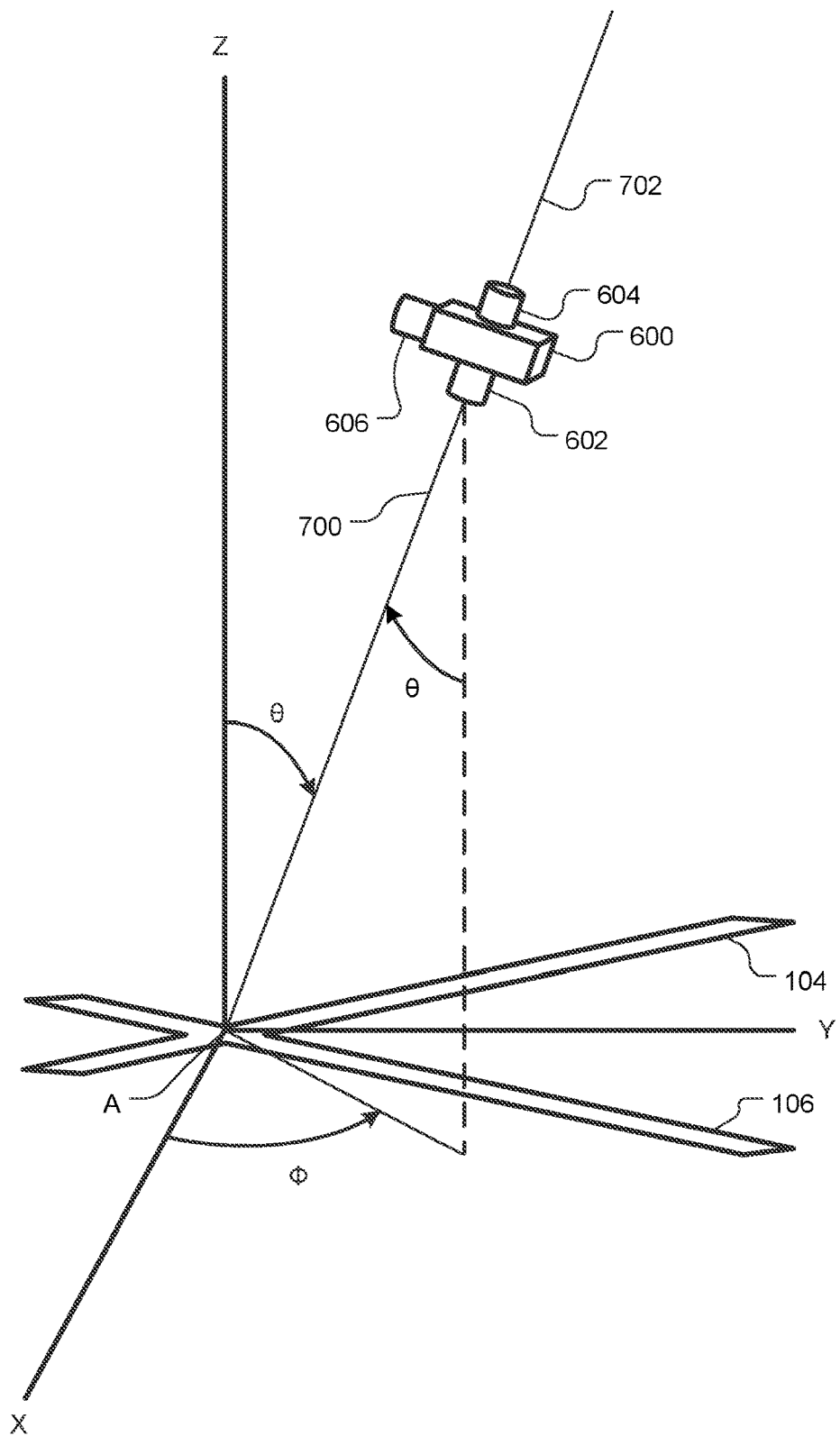

FIG. 7 schematically illustrates the coordinate system 616 of FIG. 6 repositioned so the origin of the coordinate system is disposed where the optical axis 700 of the camera 602 intersects the terrain 102, i.e., at point A, the center of an image captured by the camera 602. The attitude of the camera 602, as ascertained by the star tracker 604, provides angles θ and φ. Angles θ and φ constrain the location of the camera 602 to lie along a line 702, thus removing the attitude ambiguity present in prior art systems (FIG. 1).

Figure 8:
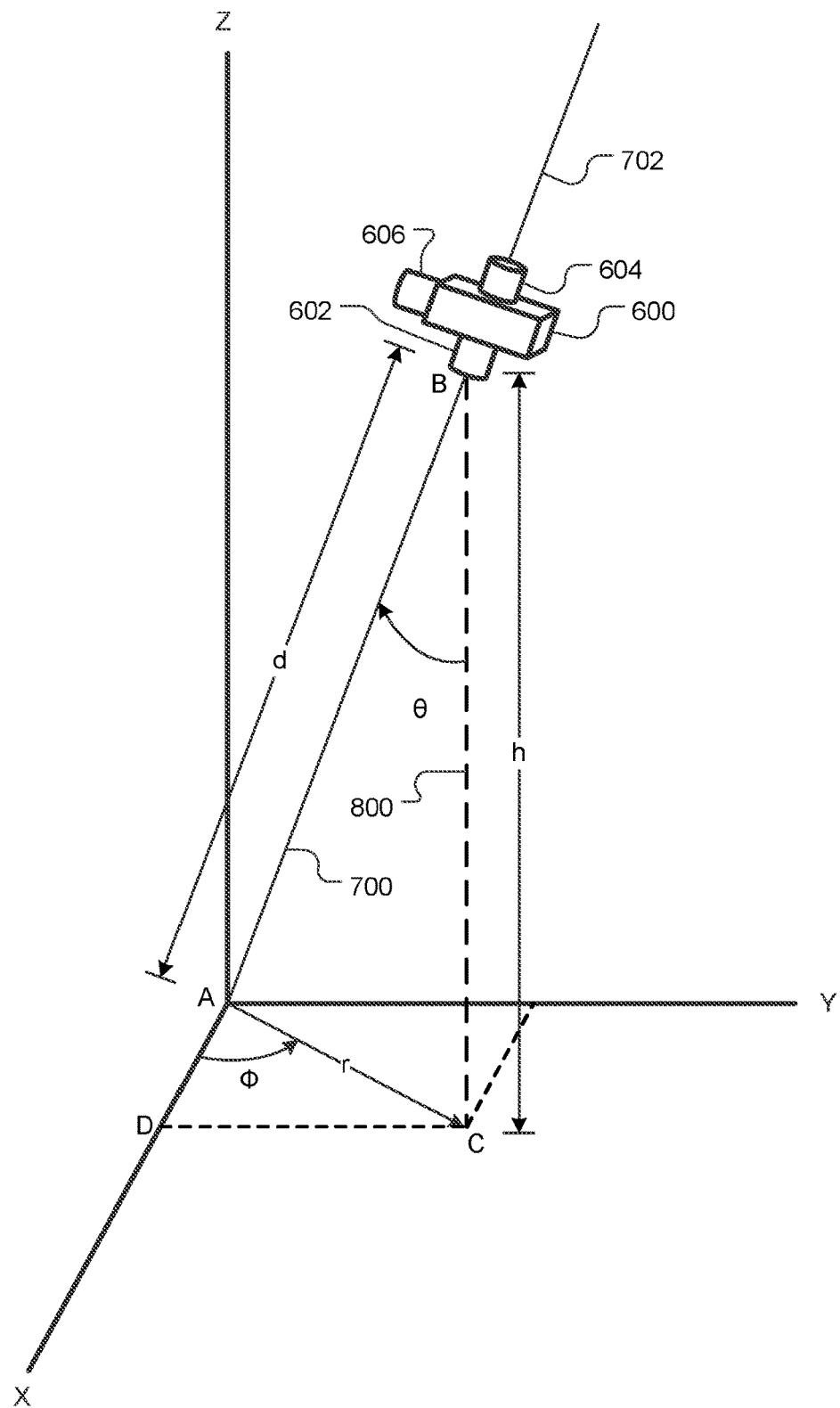

Some embodiments of the terrain matching system 600 include range finders, such as radar or LIDAR altimeters. In such embodiments, as schematically illustrated in FIG. 8, the terrain matching system 600 can ascertain its distance d from the terrain 102. Instead of a radar or LIDAR altimeter, the camera 602 may be used to ascertain the distance d, such as by using focal distance or stereoscopic or stadiametric methods, or any other suitable range finding method may be used to ascertain the distance d or h. Thus, the position of the camera 602 in three-dimensional space is automatically ascertained and can be specified in any suitable coordinate system, such as spherical coordinates (d, θ, φ).

Figure 9:
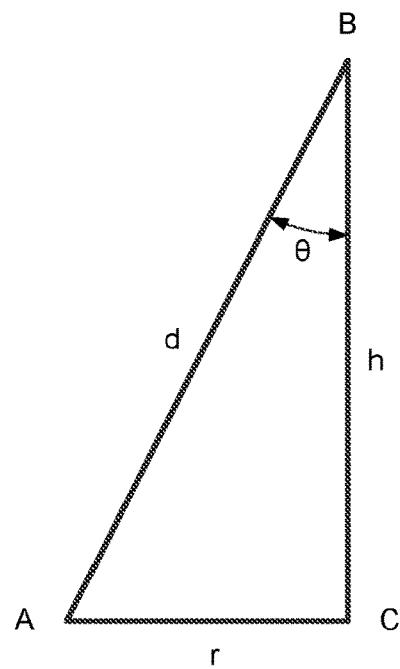
FIGS. 9 and 10 illustrate triangles in FIG. 8, to facilitate explanation of trigonometric processing performed by embodiments of the present invention.

Once angle θ and distance d are ascertained, the true height h of the camera 602 above the terrain 102 can be calculated trigonometry. For example, points A, B (camera 602) and C define a right triangle ABC. Distance r is the distance between: (a) the apparent point A on the terrain 102 below the camera 602 (i.e., the center of image 200 in FIG. 2) and (b) the true point C on the terrain 102 below the camera 600. Triangle ABC is shown in FIG. 9. The true height h of the camera 602 above the terrain 102 may be calculated using the trigonometric identity cos θ=adjacent/hypotenuse. Substituting d and h:

$$\cos \theta = h/d \quad (1)$$

and rearranging gives:

$$h = d \cos \theta \quad (2)$$

Returning to FIG. 8, as noted, angles θ and φ constrain the location of the camera 602 to lie along the line 702. Height h (alternatively distance d) constrains the location of the camera 602 to the intersection of the line 702 and the line BC (line 800), thus removing the altitude ambiguity present in the prior art (FIG. 5). Distance h is also the z coordinate of the camera 602 in an x-y-z coordinate system.

Referring to FIGS. 8 and 9, the distance r may be calculated using the Pythagorean theorem or the trigonometric identity sin θ=opposite/hypotenuse. Substituting r and d:

$$\sin \theta = r/d \quad (3)$$

and rearranging gives:

$$r = d \sin \theta \quad (4)$$

Figure 10:
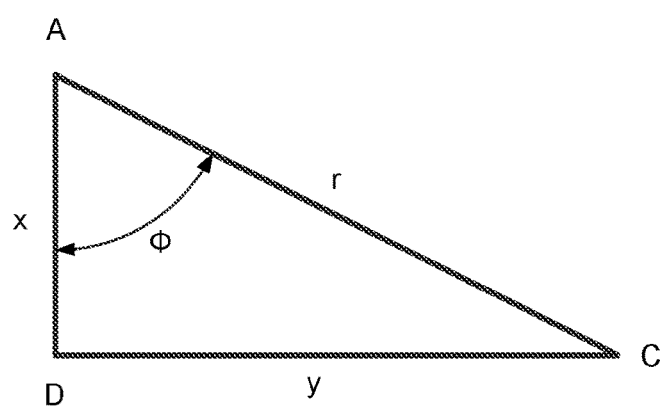

In FIG. 8, line CD is parallel to the y axis. Thus, in the x-y-z coordinate system, the y coordinate of camera 602 is equal to the length of line CD. The x coordinate of the camera 602 is equal to the length of line AD. In FIG. 8, points A, C and D define another right triangle ACD. Triangle ACD is shown in FIG. 10. Using the above-referenced trigonometric identities, x (length of line AD) and y (length of line CD) may be calculated, as follows:

$$x = r \cos \phi \quad (5)$$

$$y = r \sin \phi \quad (6)$$

Figure 11:
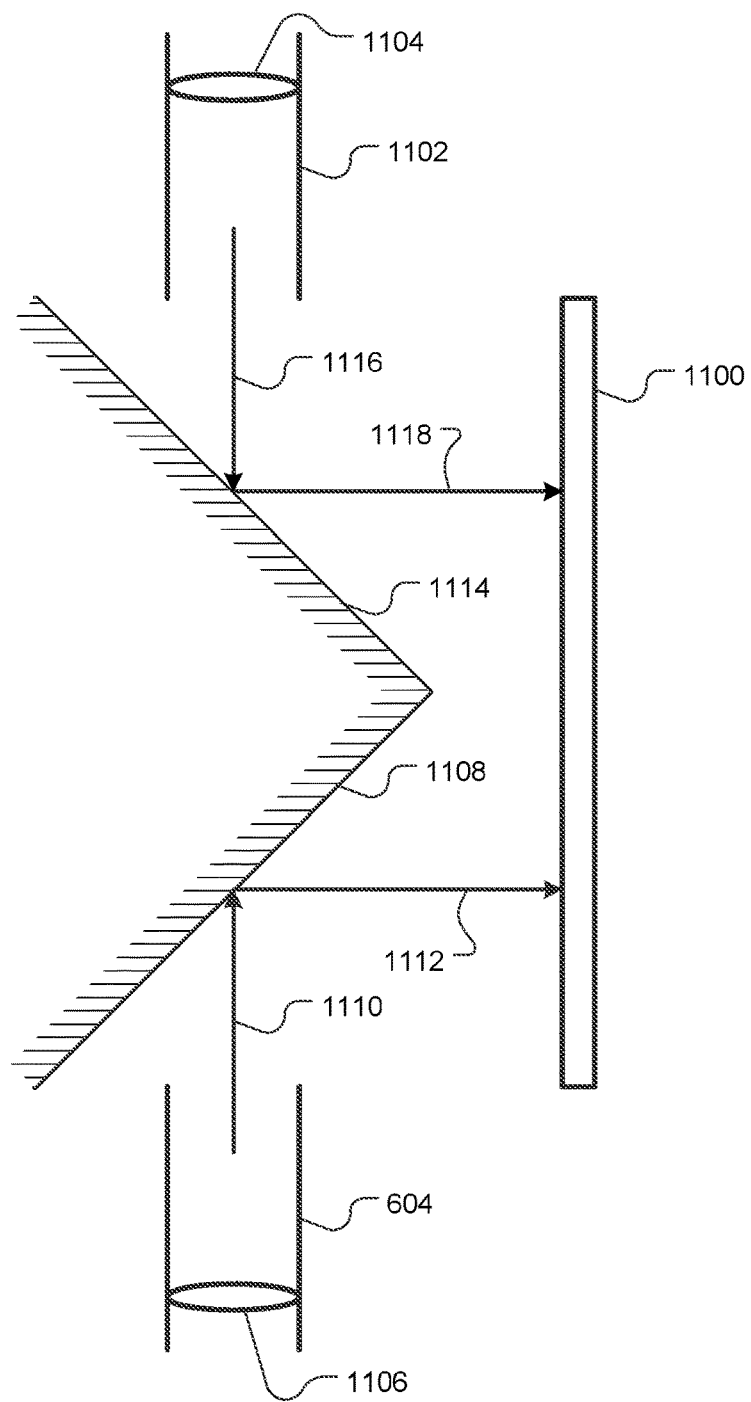
FIGS. 11-13 are schematic diagrams illustrating sharing of a common image sensor by a telescope of a star tracker and a terrain-imaging camera, according to respective embodiments of the present invention.

In some embodiments, schematically illustrated in FIG. 11, the terrain-imaging camera 602 (FIG. 6) and the star tracker 604 share a common pixelated image sensor 1100. As shown in FIG. 11, a telescope 1102 of the star tracker 604 includes an objective lens 1104, and the camera 604 includes an objective lens 1106. A first mirror 1108 is disposed between the objective lens 1106 of the camera 604 and the image sensor 1100. The first mirror 1108 reflects light from the objective lens 1106 toward the image sensor 1100, as indicated by arrows 1110 and 1112.

Similarly, a second mirror 1114 is disposed between the objective lens 1104 of the telescope 1102 and the image sensor 1100. The second mirror 1114 reflects light from the objective lens 1104 of the telescope 1102 toward the image sensor 1100, as indicated by arrows 1116 and 1118.

In the embodiment shown in FIG. 11, the mirrors 1108 and 1114 are perpendicular to each other, and consequently the star tracker telescope 1102 is oriented opposite the terrain-imaging camera 604. However, suitably changing the angle between the two mirrors 1108 and 1114 permits the star tracker telescope 1102 to be oriented at a desired angle, relative to the terrain-imaging camera 604.

Figure 12:
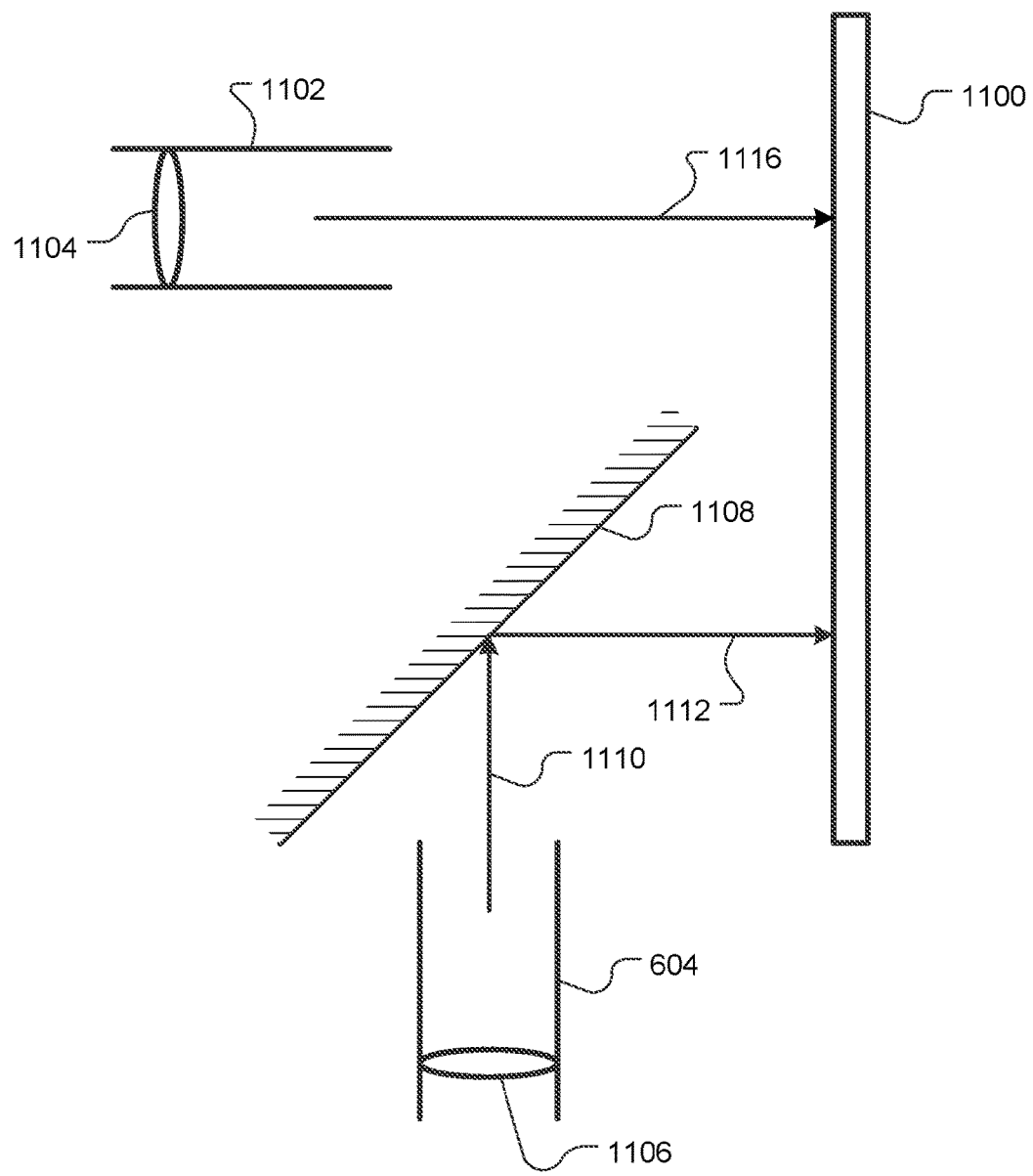

Omitting the second mirror 1114, as shown in FIG. 12, or by adding an additional mirror(s) (not shown), the star tracker telescope 1102 may be oriented perpendicular (or at an other desired angle) to the terrain-imaging camera 604.

Figure 13:
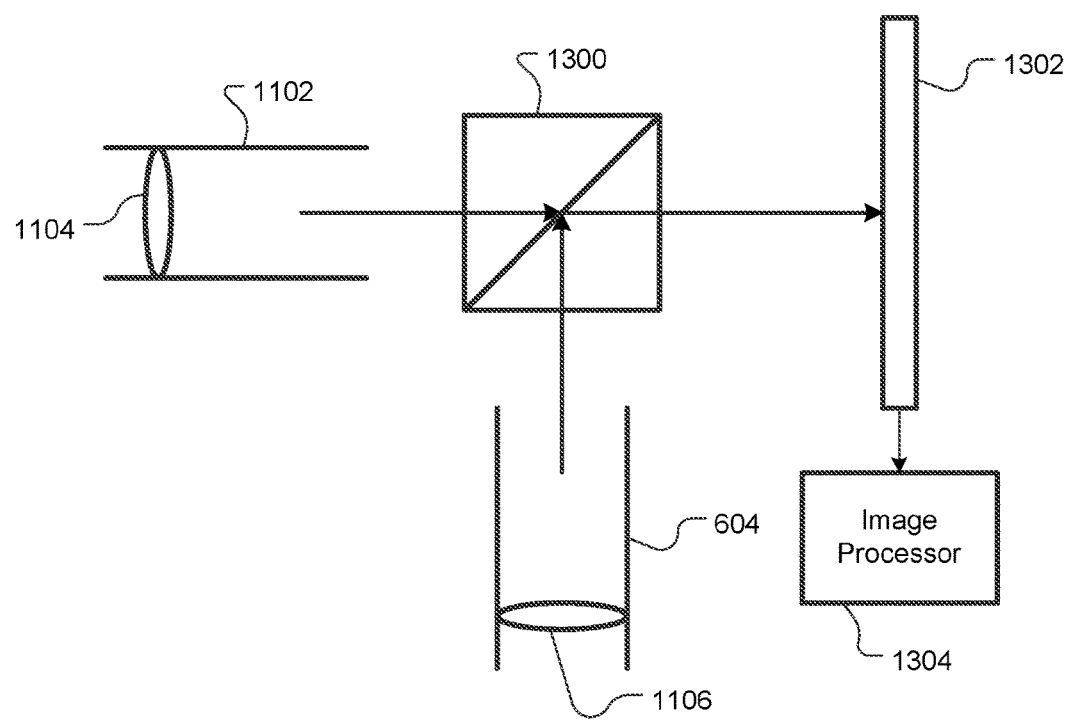

Alternatively, as schematically shown in FIG. 13, the mirror can be replaced by an optical splitter 1300, which acts as an optical combiner. In this case, an image from the terrain-imaging camera 604 overlaps an image from the star tracker telescope 1102 on an image sensor 1302. This may be acceptable, in that the image from the star tracker telescope 1102 likely contains only a relatively small number of bright celestial objects that may be identified and separated from the image of the terrain 102 by an image processor 1304. Advantageously, the image sensor 1302 is half the size and weight, and consumes approximately half the electrical power, of the image sensor 1100 shown in FIGS. 11 and 12.

Figure 14:
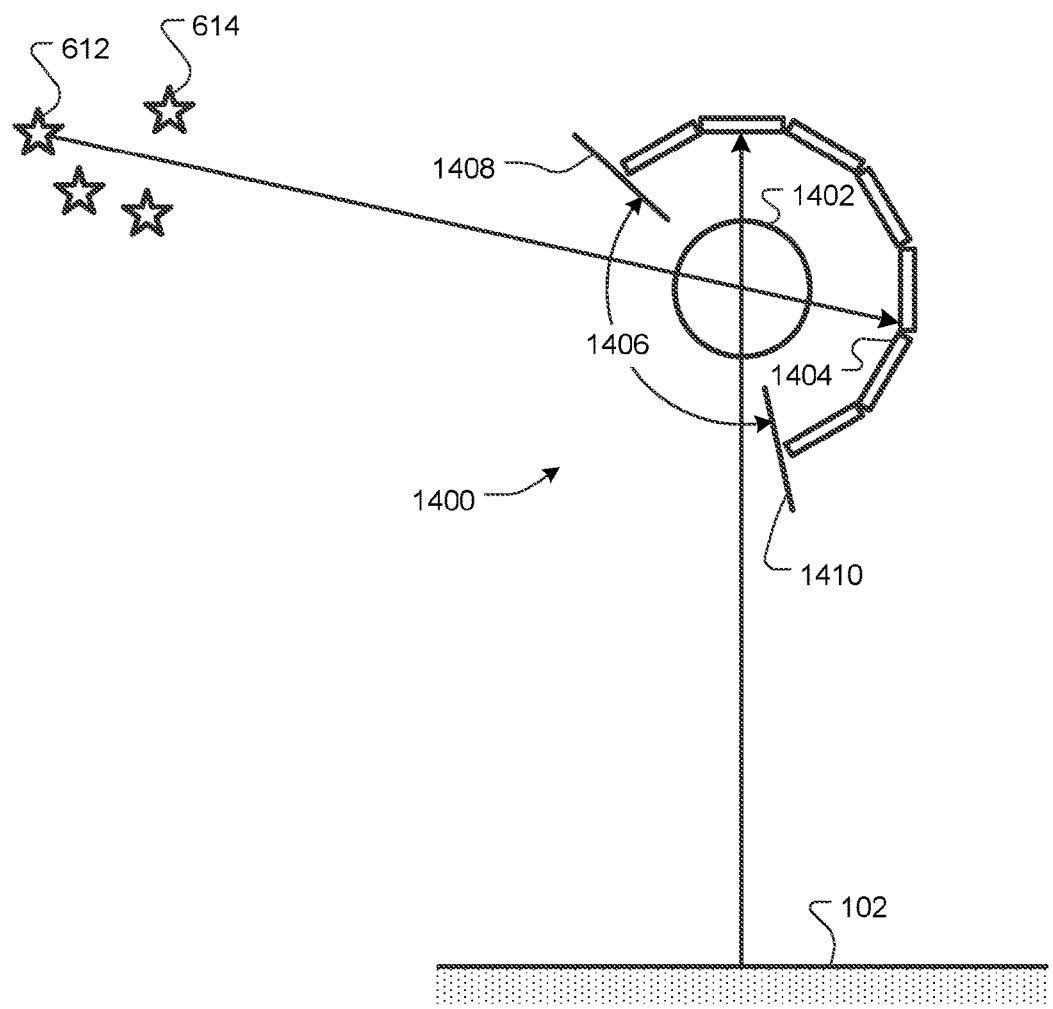
FIG. 14 is a schematic diagram illustrating a single camera used for both star tracking and terrain imaging, according to an embodiment of the present invention.

In yet another embodiment, schematically illustrated in FIG. 14, a single wide-angle optical camera 1400 images both the terrain 102 and the bright celestial object(s) 612-614. In this case, a single objective lens 1402 has a field of view sufficiently large to simultaneously include the terrain 102 and at least one bright celestial object, represented by stars 612 and 614. For example, the wide-angle optical camera 1400 may include a ball or monocentric lens 1402 and one or more pixelated image sensors, represented by image sensor 1404, and provide a wide field of view, as indicated at 1406. Optionally, the wide-angle camera 1400 may include baffles 1408 and 1410 to limit the field of view and/or to shade the image sensor(s) 1404 from the sun or a sunlit moon. Optionally, the wide-angle camera 1400 may define more than one aperture through which the terrain 102 and the bright celestial object(s) 612-614 are imaged, respectively. Additional details of the wide field of view camera 1400 may be found in commonly-assigned U.S. patent application Ser. No. 13/893,987, filed May 14, 2013 and published as U.S. Pat. Publ. No. 2014/0340522, the entire contents of which are hereby incorporated by reference herein, for all purposes.

Although the terrain matching system 600 (FIG. 6) is described as including an optical camera 602, in some embodiments the optical camera 602 may be replaced by another type of imager, such as a radar imager or a LIDAR imager. In other respects, the terrain matching system 600 may operate as described with respect to the optical camera 602, with appropriate modifications, such as using a radar antenna instead of an object lens and optical image sensor.

Figure 15:
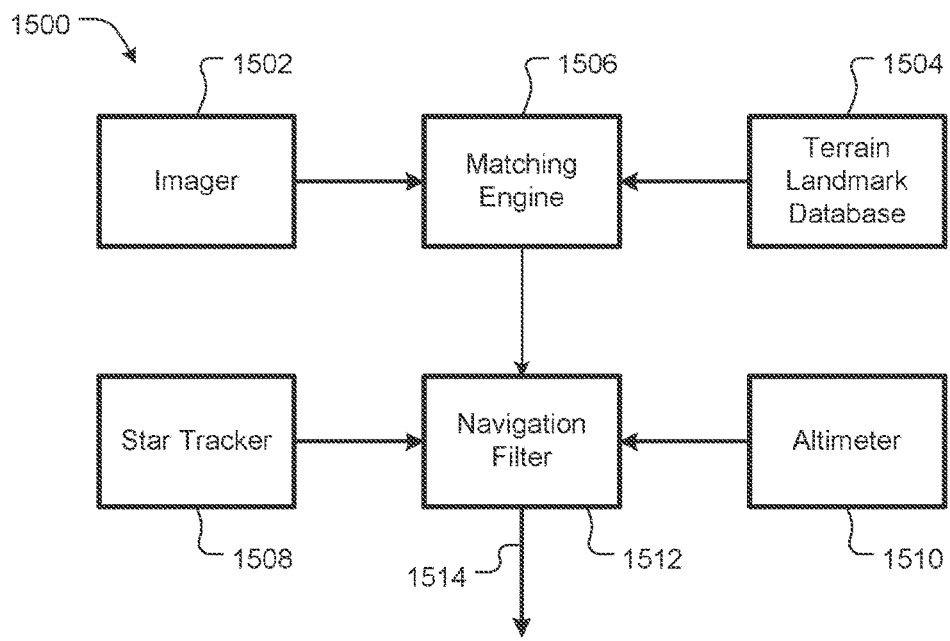
FIG. 15 is a schematic block diagram of a terrain matching location system, according to an embodiment of the present invention.

FIG. 15 is a schematic block diagram of a terrain matching location system 1500, such as the terrain matching system 600 (FIG. 6). The terrain matching location system 1500 includes an imager 1502. The imager 1502 may be a camera that includes a pixelated optical image sensor, as discussed with respect to FIGS. 6-8 and 11-14. Alternatively, the imager 1502 may be a radar or a LIDAR system.

A terrain landmark database 1504 stores data representing imagery of landmarks on terrain 102, at least some of which are expected to be imaged by the imager 1502. The terrain imagery is stored in association with location information, so when a matching engine 1506 matches an image from the imager 1502 with imagery data in the terrain landmark database 1504, the matching engine 1506 can estimate a location of the terrain matching location system 1500. The landmark imagery is selected and stored in a manner suitable for the type of imager 1502 used, ex. optical imagery, surface topography, radar imagery, LIDAR imagery, etc. Optionally or alternatively, the terrain landmark database 1504 may generate the imagery data, such as by a predictive model, including modeling changes in the imagery data over time, such as due to changes in lighting based on time of day, season, etc., changes in topography due to erosion, weather, rotation of the earth, and the like.

A star tracker 1508 includes a telescope, an ephemeral database and an image sensor (or shares an image sensor with the imager 1502). The star tracker 1508 is held in a fixed orientation, relative to the imager 1502, so the star tracker 1508 can provide attitude information about the imager 1502. The ephemeral database need not necessarily be sufficient for the star tracker 1508 to ascertain a location in three-dimensional space of the terrain matching location system 1500. The ephemeral database needs to be sufficient only for the star tracker 1508 to ascertain an attitude of the star tracker 1508.

Optionally, the terrain matching location system 1500 includes an altimeter 1510. As noted, the altimeter 1510 may be a radar altimeter, a LIDAR altimeter, a barometric altimeter or any other suitable device capable of measuring height d or h of the altimeter 1510 above the terrain 102 (FIG. 8) or height of the altimeter 1510 relative to another reference and from which the height d or h can be calculated or estimated.

A navigation filter 1512 receives inputs from the matching engine 1506, from the star tracker 1508 and from the altimeter 1510 (if present). The input from the matching engine provides an estimate of the location of the terrain matching location system 1500. The input from the star tracker 1508 need not provide location information about the system 1500. The input from the star tracker 1508 provides an indication of the attitude of the imager 1502 or of the star tracker 1508, from which the attitude of the imager 1502 may be calculated. The input from the altimeter 1510 provides the height d or h of the altimeter 1510 above the terrain 102 (FIG. 8) or the height of the altimeter 1510 relative to another reference and from which height d or h can be calculated or estimated.

The navigation filter 1512 uses its inputs, including possibly multiple sequential measurements, and a dynamics model of the terrain matching location system 1500, to generate an estimate 1514 of the location of the terrain matching location system 1500 that is better than an estimate obtained by using any one input or measurement alone. The dynamics model may include items such as orientation of the imager 1502 relative to the orientation of the star tracker 1508, size of the pixels in the imager 1502, resolution of optics in the imager 1502, height, such as d or h in FIG. 8, of the imager 1502 (if available), as well as trigonometry and physical laws of motion. The resolution of the optics in the imager 1502 may include information about width of an edge, for example the edge 412 in FIG. 4, as projected on a pixelated image sensor. The navigation filter may be, or may include, a Kalman filter, also known as linear quadratic estimation (LQE).

Figure 16:
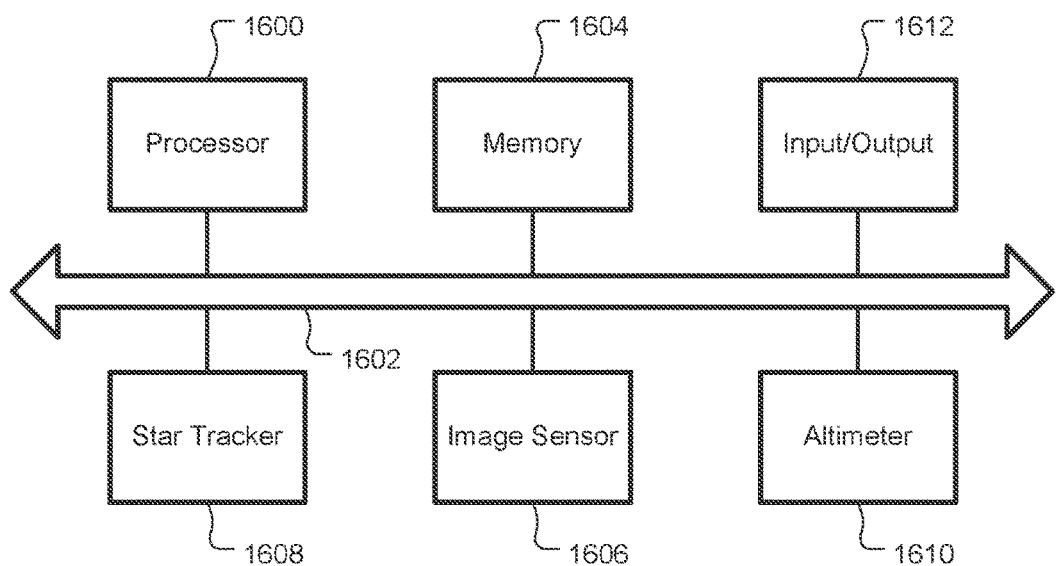
FIG. 16 is a schematic block diagram illustrating a hardware implementation of a terrain matching location system, according to an embodiment of the present invention.

FIG. 16 is a schematic block diagram illustrating a hardware implementation of the terrain matching location system 1500, according to one embodiment. A processor 1600 is communicatively coupled via a bus 1602 to a memory 1604 that stores data and instructions for the processor 1600. The processor 1600 fetches and executes the instructions. In so doing, the processor 1600 performs some of the operations described herein, such as obtaining image data from a pixelated optical, or other suitable, image sensor 1606 and comparing the image data to terrain landmark data, which may also be stored in the memory 1604. The image sensor 1606 may be replaced by a suitable radar or LIDAR imager.

The processor 1600 may also perform some or all of the functions of the navigation filter 1512 (FIG. 15). In this context, the processor may obtain attitude data from a star tracker 1608 and, optionally, height data from an altimeter 1610. The star tracker 1608 may include an ephemeral database and a processor that matches images of stars or other bright celestial navigational objects to information in the ephemeral database to generate attitude information. Optionally or alternatively, the ephemeral database may be stored in the memory 1604, and/or the processor 1600 may match the images of the bright celestial navigational objects to the information in the ephemeral database to generate the attitude information. In other words, the processor 1600 may implement any part of the start tracker 1608. The processor 1600 may perform all or some of the functions of the image processor 1304 (FIG. 13).

A suitable input/output device 1612 may be coupled via the bus 1602 to the processor 1600, and optionally to the other components 1604-1610. A navigation solution, calculated or estimated by the processor 1600, may be output via the input/output device 1612, such as to provide navigation data in a guidance, navigation and control (GNC) system. The input/output device 1612 may be used to load the memory 1604 with ephemeral data, terrain landmark data and/or operational parameters.

Figure 17:
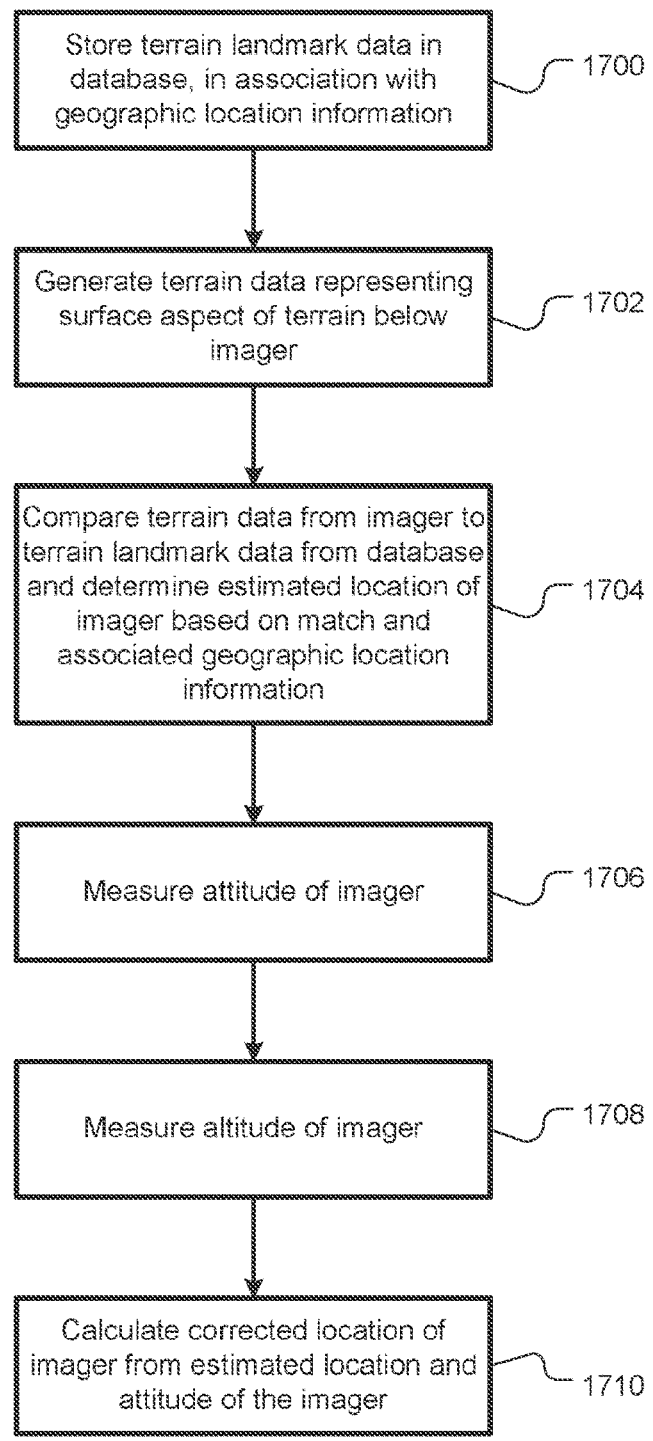
FIG. 17 is a flowchart that schematically illustrates operations of a location determining method using terrain matching, according to an embodiment of the present invention.

An embodiment of the present invention provides a method for automatically determining a location. FIG. 17 is a flowchart that schematically illustrates operations of such a method. At 1700, terrain landmark data is stored in an electronic database, such as in the memory 1604 (FIG. 16). The terrain landmark data is stored in association with geographic location information about the terrain landmark data.

At 1702, an imager, such as the camera 602 (FIG. 6), generates terrain data representing a surface aspect of terrain below the imager by imaging the terrain from above. The terrain data may include an optical image of the terrain, a radar-generated image, a LIDAR-generated image, topographical data or other suitable data that can be compared to the stored terrain landmark data. Thus, generating the terrain data may include generating the terrain data with an optical camera. The terrain data may include terrain image data.

A common image sensor may be used to image the terrain and to image a bright celestial object, as discussed with respect to FIGS. 11-14. Light from a telescope of the star tracker may be combined with light from an object lens of a terrain-imaging camera, as discussed with respect to FIG. 13. One or two mirrors may be used to reflect light from an objective lens of a terrain-imaging camera and/or light from a telescope of the star tracker toward the common image sensor, as discussed with respect to FIGS. 11 and 12.

A single objective lens having a field of view sufficiently large to simultaneously include the terrain and at least one bright celestial object may be used, as discussed with respect to FIG. 14. In this case, generating the terrain data and automatically measuring the attitude of the imager with the star tracker may include using the single objective lens to simultaneously image the terrain and the at least one bright celestial object.

Optionally or alternatively, generating the terrain data may include generating the terrain data with a radar or a LIDAR. The terrain data may include terrain topographical data.

At 1704, the terrain data from the imager is automatically compared to the terrain landmark data, such as by the matching engine 1506 (FIG. 15). An estimated location of the imager is determined, based on: (a) a match between the terrain data and the terrain landmark data and (b) the geographic location information associated with the terrain landmark data.

At 1706, the attitude of the imager is measured by a star tracker and, optionally, at 1708, an altitude of the imager is measured, such as by the altimeter 1510 (FIG. 15) or using the camera 602. At 1710, a corrected location of the imager is automatically calculated, such as by the navigation filter 1512 (FIG. 15), from the estimated location of the imager, the attitude of the imager and, if available, the altitude of the imager. Note that the corrected location of the imager may define a line, such as line 702 (FIG. 7) or a portion of such a line.

Figure 18:
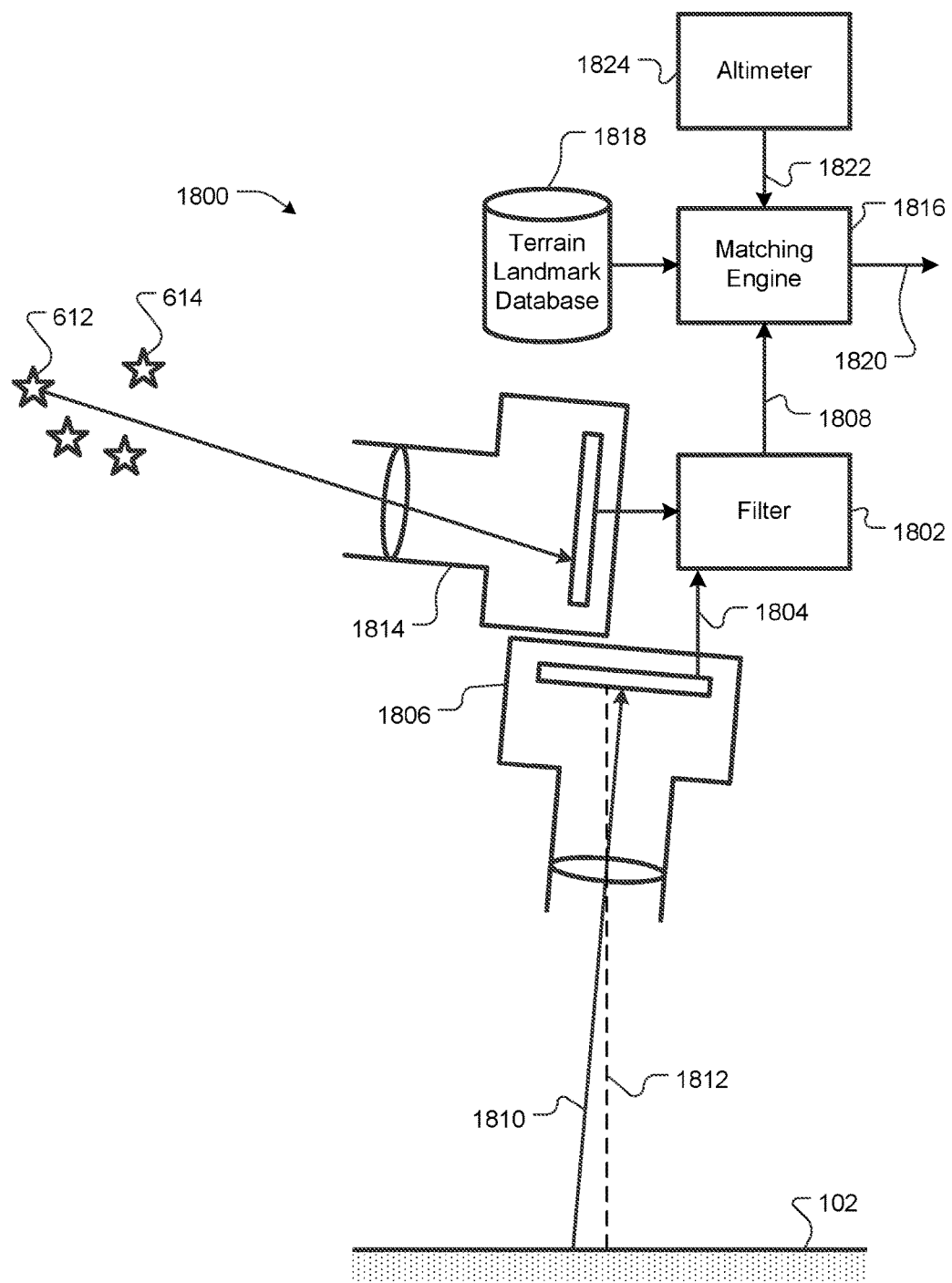
FIG. 18 is a schematic diagram illustrating a terrain matching location system, according to another embodiment of the present invention.

FIG. 18 is a schematic diagram illustrating a terrain matching location system 1800, according to another embodiment of the present invention. In the embodiment shown in FIG. 18, a filter 1802 receives image data 1804 from a camera 1806 and generates corrected image data 1808 by compensating for deviation of the optical axis 1810 of the camera 1806 from normal 1812 to the terrain 102, based on angular orientation of the camera 1806 as measured by a star tracker 1814. The compensation may be a form of perspective distortion correction. The corrected image data 1808 represents an image of the terrain 102, as the image would appear if the camera 1806 had been oriented normal 1812 to the terrain 102. The filter 1802 is configured to correct the image data 1804, according to the angular orientation of the camera 1806, thereby generating the corrected image data 1808.

A matching engine 1816 then compares the corrected image data 1808 to terrain image data stored in a terrain landmark database 1818. The matching engine 1816 outputs a location solution 1820, based on a match between the corrected image data 1808 and the terrain image data stored in the terrain landmark database 1818. Optionally, the matching engine 1816 also uses information 1822 about height of the system 1800 above the terrain 102, such as provided by an altimeter 1824, to match the corrected image data 1808 to the terrain image data stored in a terrain landmark database 1818. Optionally, the star tracker 1814 and the camera 1806 share a common image sensor, and/or a single camera may be used for both star tracking and terrain imaging, as described with respect to FIGS. 11-14.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

Embodiments, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:
1. A location determining system, comprising:
 a database storing terrain landmark data in association with geographic location information about the terrain landmark data;

an imager configured to aim downward toward terrain below the imager and generate terrain data representing a surface aspect of the terrain;

a matching engine that compares the terrain data to the terrain landmark data and determines an estimated location of the imager, based on: (a) a match between the terrain data and the terrain landmark data and (b) the geographic location information associated with the terrain landmark data;

a star tracker configured to measure attitude of the imager; and a navigation filter that calculates a corrected location of the imager from: (a) the estimated location of the imager and (b) the attitude of the imager.

2. A location determining system according to claim 1, wherein the imager comprises a radar.

3. A location determining system according to claim 2, wherein the terrain data comprises terrain topographical data.

4. A location determining system according to claim 1, wherein the imager comprises an optical camera and the terrain data comprises terrain image data.

5. A location determining system according to claim 4, wherein the imager and the star tracker share a common image sensor.

6. A location determining system according to claim 5, wherein the imager further comprises an objective lens and the star tracker comprises a telescope, the location determining system further comprising a beam splitter disposed to combine light from the objective lens and light from the telescope into an output signal directed toward the common image sensor.

7. A location determining system according to claim 5, wherein the imager further comprises an objective lens and the star tracker comprises a telescope, the location determining system further comprising:

a first mirror disposed between the objective lens and the common image sensor and oriented to reflect light from the objective lens toward the common image sensor; and a second mirror disposed between the telescope and the common image sensor and oriented to reflect light from the telescope toward the common image sensor.

8. A location determining system according to claim 1, wherein the imager and the star tracker comprise a single objective lens having a field of view sufficiently large to simultaneously include the terrain and at least one bright celestial object.

9. A location determining system according to claim 1, wherein the imager and the star tracker comprise a single objective lens configured to simultaneously capture light from the terrain and from at least one bright celestial object.

10. A location determining system according to claim 9, wherein the imager and the star tracker share a common image sensor onto which light from the single objective lens impinges.

11. A location determining system according to claim 1, further comprising an altimeter configured to provide an altitude of the imager above the terrain, wherein the navigation filter calculates the corrected location of the imager from: the estimated location of the imager, the attitude of the imager and the altitude of the imager above the terrain.

12. A location determining system according to claim 11, wherein the altimeter is configured to determine the altitude of the imager based on the terrain data from the imager.

13. A location determining system according to claim 12, wherein the imager comprises an optical camera and the terrain data comprises terrain image data.

14. A location determining system according to claim 12, wherein the imager comprises a radar.

15. A location determining system according to claim 14, wherein the terrain data comprises terrain topographical data.

16. A method for automatically determining a location, the method comprising:

storing, in an electronic database, terrain landmark data in association with geographic location information about the terrain landmark data;

generating, by an imager, terrain data representing a surface aspect of terrain below the imager by imaging the terrain from above;

automatically comparing the terrain data to the terrain landmark data and outputting an estimated location of the imager, based on: (a) a match between the terrain data and the terrain landmark data and (b) the geographic location information associated with the terrain landmark data;

automatically measuring attitude of the imager with a star tracker; and automatically calculating a corrected location of the imager from: the estimated location of the imager and the attitude of the imager.

17. A method according to claim 16, wherein generating the terrain data comprises generating the terrain data with a radar and the terrain data comprises terrain topographical data.

18. A method according to claim 16, wherein generating the terrain data comprises generating the terrain data with an optical camera and the terrain data comprises terrain image data.

19. A method according to claim 18, wherein generating the terrain data and automatically measuring the attitude of the imager with the star tracker comprises using a common image sensor to image the terrain and to image a bright celestial object.

20. A method according to claim 19, further comprising combining light from an objective lens of the imager and light from a telescope of the star tracker into an output signal directed toward the common image sensor.

21. A method according to claim 19, further comprising:

reflecting light, with a first mirror, from an objective lens of the imager toward the common image sensor; and reflecting light, with a second mirror, from a telescope of the star tracker toward the common image sensor.

22. A method according to claim 16, further comprising:

providing a single objective lens having a field of view sufficiently large to simultaneously include the terrain and at least one bright celestial object; wherein:

generating the terrain data and automatically measuring the attitude of the imager with the star tracker comprises using the single objective lens to simultaneously image the terrain and the at least one bright celestial object.

23. A method according to claim 16, further comprising:

providing a single objective lens configured to simultaneously capture light from the terrain and from at least one bright celestial object; wherein:

generating the terrain data and automatically measuring the attitude of the imager with the star tracker comprises using the single objective lens to simultaneously direct light from the terrain and from the at least one bright celestial object onto a common image sensor.

24. A method according to claim 16, further comprising:
automatically measuring an altitude of the imager above the terrain; wherein:
automatically calculating the corrected location of the imager comprises automatically calculating the corrected location of the imager from: the estimated location of the imager, the attitude of the imager and the altitude of the imager above the terrain.

25. A method according to claim 24, wherein automatically measuring the altitude of the imager above the terrain comprises automatically determining the altitude based on the terrain data from the imager.

26. A method according to claim 25, wherein generating the terrain data comprises generating the terrain data with an optical camera and the terrain data comprises terrain image data.

27. A method according to claim 25, wherein generating the terrain data comprises generating the terrain data with a radar.

28. A method according to claim 27, wherein the terrain data comprises terrain topographical data.

29. A computer program product comprising a non-transitory computer-readable medium on which are stored computer instructions that, when executed by a processor coupled to an imager configured to aim downward toward terrain below the imager and generate terrain data representing a surface aspect of the terrain, a star tracker configured to measure attitude of the imager and a database storing terrain landmark data in association with geographic location information about the terrain landmark data, establish processes that perform a computer-implemented method for automatically determining a location of the imager, the processes comprising:
a matching engine process that compares the terrain data from the imager to the terrain landmark data from the database and determines an estimated location of the imager, based on: (a) a match between the terrain data and the terrain landmark data and (b) the geographic location information associated with the terrain landmark data;
a process configured to use the star tracker to measure attitude of the imager; and
a navigation filter process that calculates a corrected location of the imager from: (a) the estimated location of the imager and (b) the attitude of the imager.

30. A location determining system, comprising:
a camera having an optical axis and configured to image terrain below the camera and to provide image data representing an image of the terrain;
a star tracker mechanically coupled to the camera and configured to measure angular orientation of the camera;
a database storing landmark imagery associated with respective corresponding geographic locations;
a filter coupled to the camera and to the star tracker and configured to generate corrected image data by compensating for deviation of the optical axis from normal to the terrain, based on the angular orientation of the camera; and
a matching engine coupled to the filter and to the database and configured to search the database for a landmark image that matches, within a predetermined criterion, the corrected image data and to output a geographic location that corresponds to a found landmark image.

31. A location determining system according to claim 30, further comprising:
a range finder configured to measure distance between the camera and the terrain; and wherein:
the matching engine is coupled to the range finder and is configured to use the distance to search the database for the landmark image that matches, within the predetermined criterion, the corrected image data.

* * * * *